United States Patent Office 2,924,115
Patented Feb. 9, 1960

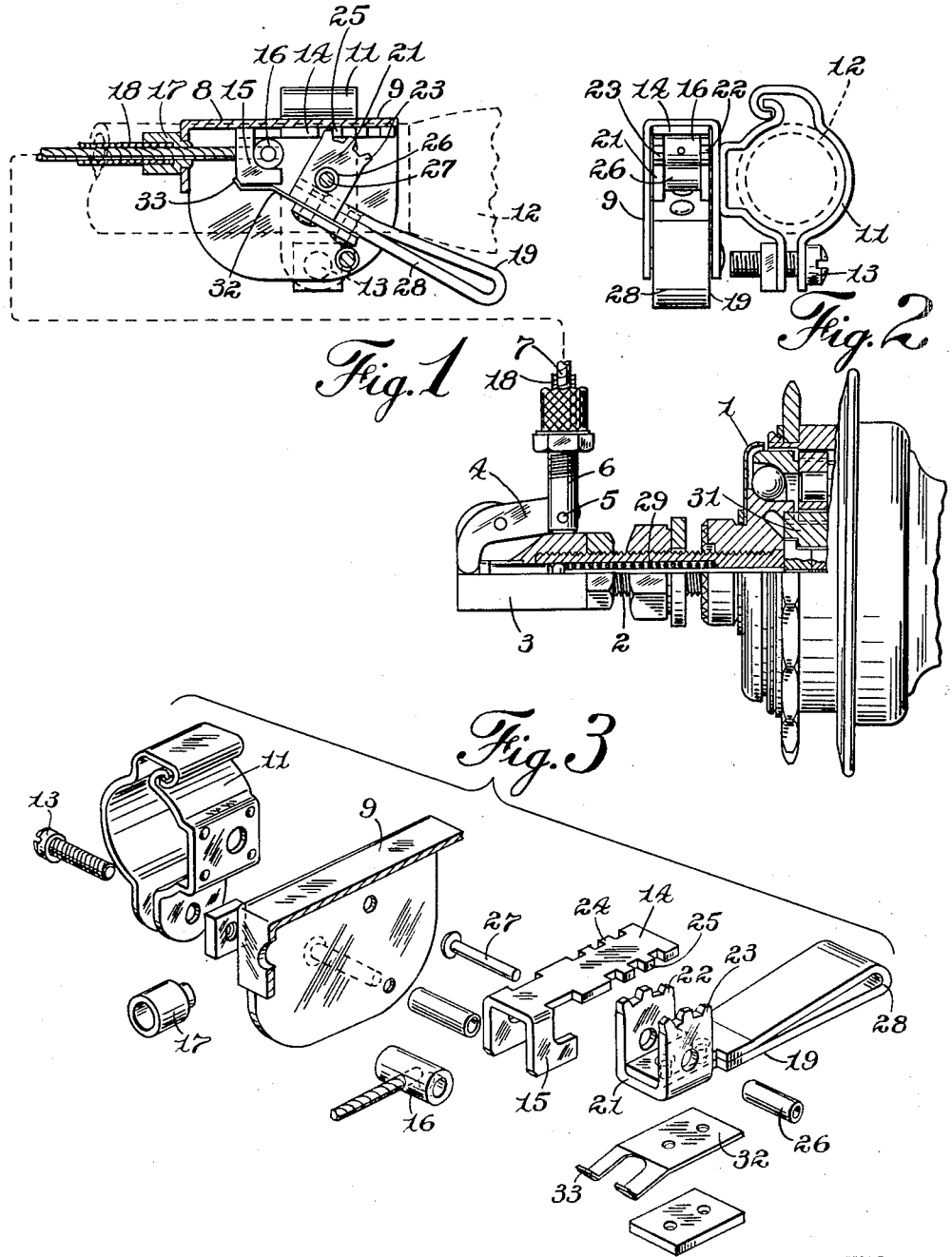

2,924,115

TWO-SPEED GEARING FOR VELOCIPEDES

Edwin Elliott Hood, Elmira, N.Y., assignor to Bendix Aviation Corporation, Elmira Heights, N.Y., a corporation of Delaware Application April 15, 1957, Serial No. 652,883

2 Claims. (Cl. 74—489)

The present invention relates to two-speed gearing for velocipedes and more particularly to a manually operable control mechanism therefor.

In two-speed gearing such as disclosed in applicant's prior Patent 2,609,712, issued September 9, 1952, the sun gear 21 of the planetary reduction gearing is urged toward its low gear position by a spring 31, and is moved into its high gear position by means of a lever 34 actuated by a manually operated traction cable.

The application of Gleasman et al., Ser. No. 427,192, filed May 3, 1954, discloses manual operating mechanism for the cable of a two-speed bicycle hub of this character which has been found commercially acceptable, but which is rather expensive to manufacture.

It is an object of the present invention to provide a novel cable actuating means for a two-speed bicycle hub which is simple and economical to manufacture, and easy and convenient to operate.

It is another object to provide such a device including a latch mechanism for securely holding the device in high gear position.

It is another object to provide such a device which is easily released by reverse pressure on its operating handle.

Further objects and advantages will be apparent from the following description taken in connection with the accompanying drawing in which:

Fig. 1 is a side elevation of a cable operating mechanism forming a preferred embodiment of the invention, partly broken away and in section;

Fig. 2 is an end view of the operating mechanism from the right in Fig. 1; and

Fig. 3 is an exploded view of the operating parts of the cable actuating device.

In Fig. 1 of the drawing there is illustrated a portion of a two-speed bicycle hub 1 on the axle 2 of which is mounted a fitting 3 carrying a bell crank lever 4 to which is pivoted at 5 the terminal portion 6 of an actuating cable 7.

The actuating device for the cable, indicated generally by numeral 8, comprises a skeleton frame 9 attached in any suitable manner as by spot welding to a clamping fixture 11 adapted to be frictionally mounted on the handle bar 12 of the vehicle, or in any convenient location, by means of a clamping bolt 13.

A rack member 14, best illustrated in Fig. 3, is slidably mounted in the upper portion of the frame 9, and has a hook-shaped anchorage 15 adapted to receive a cross bar 16 fixed in any suitable manner on the adjacent end of the cable 7. The cable enters the frame 9 through a bearing nipple 17 which also forms a support for the end of the outer casing 18 of the cable 7.

Means for guiding and actuating the rack 14 is provided comprising a manually operable member 19 comprising a twin gear sector 21 having pairs of teeth 22, 23 adapted to mesh with corresponding teeth 24, 25 formed on the sides of the rack member 14. The member 19 is pivoted in the frame 9 by means of a cylindrical bushing 26 mounted on a pin 27 passing through the frame and riveted to its side member. A handle 28 fixedly mounted on the gear sector 21 is positioned for convenient operation by the rider of the vehicle.

The cable 7 is maintained under tension by the spring 29 of the shifting mechanism for the hub 1, which urges the sun gear 31 toward its low gear position. In order to shift the transmission into high gear, tension is applied to the cable 7 by downward pressure on the handle 28 until the sector 21 has moved the rack 14 to its rearward position as shown in Fig. 1.

In order to releasably hold the device in its high gear position, a yielding latch member 32 is mounted on the back of the operating member 19 and is formed with a terminal forked hook portion 33 adapted to snap over the end of the anchorage elements 15 formed on the rack 14. Thereafter, the tension of the cable 7 transmitted through the latch 32 to the operating member 19 tends to rotate said member in a clockwise direction, but since clockwise rotation is resisted by the engagement of the rack and sector teeth, the sector is held from rotation in either direction by the balanced pull of the latch in one direction and the rack teeth in the other direction, and the rack and cable are securely held in their retracted or high gear position.

When it is desired to permit the hub to return to low gear, it is merely necessary for the operator to apply a slight upward pressure on the handle 28. Initial movement of the handle and the member 19 in a counterclockwise direction is permitted by a slight amount of lost motion between the rack and sector teeth. This is sufficient to relieve the spring pressure on the latch 32 which then disengages itself from the anchorage 15, permitting the cable 7 and lever 4 to return to low gear position.

In order to facilitate the release of the latch 32, the hook 33, and the engaged portion of the anchorage 15 are preferably beveled or inclined slightly as shown in Figs. 1 and 3.

Although but one form of the invention has been shown and described in detail it will be understood that changes may be made in the precise form and arrangement of the parts without departing from the spirit of the invention.

I claim:

1. In a cable operating device for two-speed bicycle hubs or the like, a toothed rack member having a traction cable anchorage, supporting means providing a sliding bearing for the rack, a toothed gear sector meshing with the rack, means pivotally mounting the gear sector in the supporting means, manually operable means for oscillating said sector to retract the rack member and thereby apply traction to the cable, and a yielding latch arm member mounted at one end on said sector on the opposite side of its pivotal axis from said rack, the free end of said latch arm extending into position to engage and retain the rack member in its fully retracted position.

2. A cable operating device as set forth in claim 1 in which the rack and sector are so formed and mounted as to have sufficient lost motion therebetween to allow the sector to be rotated away from the retracted position sufficiently to disengage the latch member from said rack.

References Cited in the file of this patent

UNITED STATES PATENTS

| 1,582,378 | Brueckmann | Apr. 27, 1926 |

FOREIGN PATENTS

| 243,041 | Great Britain | Nov. 18, 1925 |
| 487,677 | Great Britain | June 20, 1938 |
| 421,386 | Italy | May 22, 1947 |

OTHER REFERENCES

Germany, F15926II/63K, May 17, 1956.